May 3, 1938.  T. S. JOHNSON  2,115,777
ELECTRICAL CONDUCTOR
Filed May 8, 1936
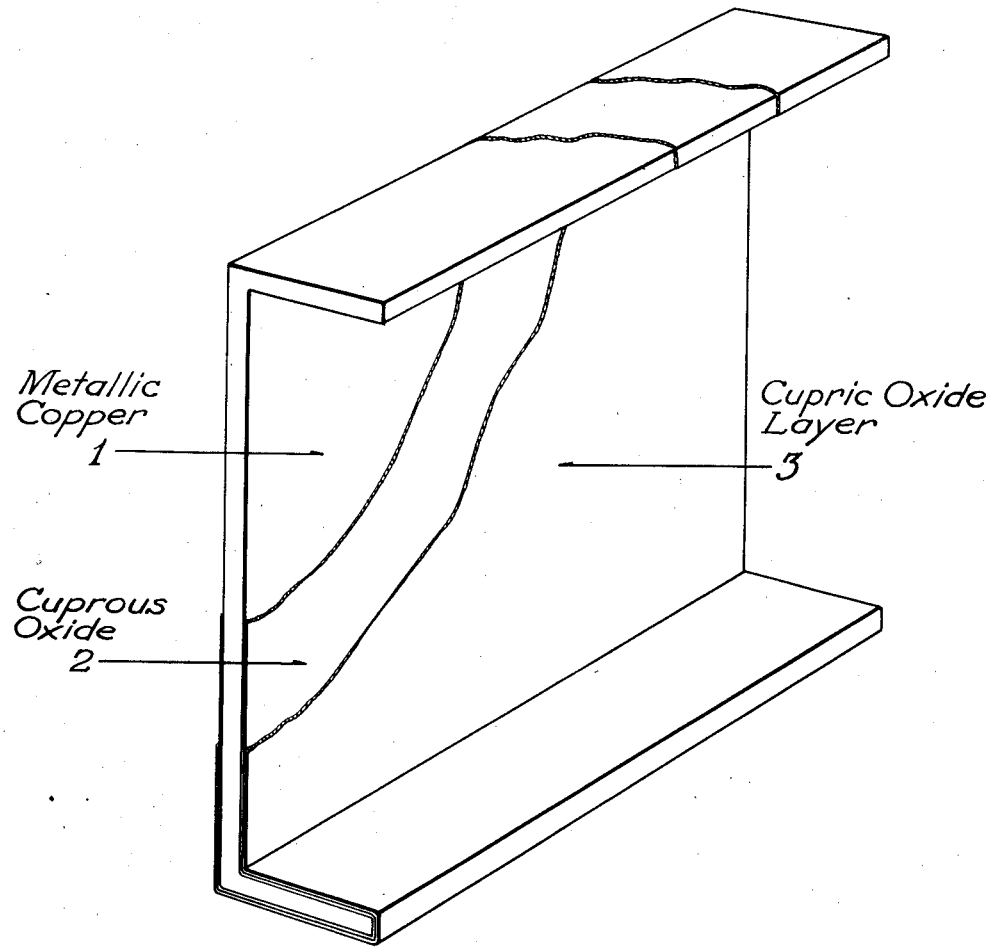
INVENTOR.
THOR S. JOHNSON.
BY
ATTORNEYS Patented May 3, 1938

2,115,777

UNITED STATES PATENT OFFICE 2,115,777

ELECTRICAL CONDUCTOR

Thor S. Johnson, Irvington, N. Y., assignor to Anaconda Wire & Cable Company, New York, N. Y., a corporation of Delaware Application May 8, 1936, Serial No. 78,559

3 Claims. (Cl. 148—6)

My invention relates to uninsulated electrical conductors such as busses or other switchboard apparatus carrying heavy currents.

Copper busbars are commonly used in sub-stations and other switchboard installations in a wide variety of shapes and cross sections such as flat, rectangular, round or channel, with a view to obtaining the greatest current carrying capacity for the conditions of installation. The current carrying capacity of such conductors is limited by the temperature rise, the usual limit of permissible temperature rise generally being 30° C., above the surrounding air temperature of 40° C. The maximum capacity will therefore be a current having an energy or resistance loss which will be dissipated by a temperature difference of 30° C., over the ambient air. The current carrying capacity of the busbar or other conductor is therefore governed not only by its conductivity and cross sectional area, but also by its ability to dissipate heat rapidly.

Heretofore copper busbars and other conductors have been given a highly polished smooth surface as, for example, by a cold drawing process or other means. The busbars retain their light color and smoothness with little change through age or use. The heat generated by the passage of the current through such conductors is given off to the surrounding air by conduction and convection and is given up by radiation. In my invention the radiation of heat from such conductors is very greatly increased so that a larger amount of current may be carried by a given conductor without exceeding the maximum temperature rise.

In accordance with my invention I form on the surface of the conductor a non-polished or roughened dark or black finish integral with the busbar structure, thereby increasing the radiation effects or efficiency over what can be obtained by a light colored highly polished surface. This black or darkened and roughened surface is obtained by a superficial oxidation of the surface of the busbar preferably accompanied by a working of the oxide thus formed on the surface of the metal. For this purpose the copper is heated to a sufficiently high temperature to cause a superficial oxidation, and is then rolled in suitable rolls which may serve to give the busbar its final shape and dimensions. This is in contrast to the cold rolling heretofore used which imparts a bright burnished surface to the metal.

The superficial oxidation forms a roughened or matte-like surface which also serves to increase its radiating properties. This may be still further enhanced by using somewhat roughened rolls, although smooth rolls will still permit a much less reflective surface, aside from the darkened color, than would be obtained without the superficial oxide coating. The outer layer of the oxide will be a cupric oxide which may merge into a red cuprous oxide which, in turn, merges into the unoxidized metallic copper. This results in the formation of a firm, lasting bond between the copper oxide and the underlying metal.

The invention is illustrated by way of example in the accompanying drawing which shows, in perspective, a busbar of channel shape treated according to my invention to provide a black adherent copper oxide, parts of the oxide coating being shown as removed to show position and arrangement.

In the conductor shown in the accompanying drawing, the metallic copper structure 1 is covered by a layer of oxides 2 in which the red cuprous oxide predominates. This is, in turn, covered with a layer 3 in which the black cupric oxide predominates or composes the entire layer. These layers adhere closely to each other and to the underlying metal forming one integral structure. The oxide coating is a permanent one, highly resistant to change, particularly in a dry atmosphere and, being completely oxidized, is unaffected by oxygen or by heating.

Inasmuch as the amount of heat given off by radiation for any given temperature is directly proportional to the emissivity of the surface, a perfectly black body has the most radiating effect or emissivity, and the black oxide coating closely approaches this ideal. For example, under a given set of conditions in which a polished copper surface dissipated heat at a rate of 0.0027 watt per square inch when freshly washed, the rate of dissipation of heat increased to 0.0029 after being tarnished in service, whereas a similar conductor treated according to my invention showed a heat dissipating capacity of 0.0038 watt per square inch, an increase of about 30%. The formation of the black matte or roughened surface as an integral part of the conductor has the advantage over the exteriorly applied coatings or surfaces in that it is not affected by age nor by deterioration, and incurs no maintenance expense or difficulties.

While the invention has been shown as applied to a channel-shape busbar, it will be understood that it may be applied to any of the usual cross sectional shapes such as bar, rectangle, circular or special forms, the invention being in the surface formed on such structures and not in the shape of the structure itself.

What I claim is—

1. A method of finishing the surfaces of copper electric conductors which comprises oxidizing the surface thereof to cupric oxide, and then hot rolling said surface.

2. A method of finishing the surfaces of copper electric conductors which comprises oxidizing the surface thereof to cupric oxide, and then hot working said surface.

3. A copper electric conductor having a black matte surface of cupric oxide and an underlying layer of cuprous oxide hot rolled into an integral structure with the underlying metal.

THOR S. JOHNSON.